United States Patent [19]

Kelderman

[11] Patent Number: 4,825,958

[45] Date of Patent: May 2, 1989

[54] HYDRAULIC LOCK FOR A FLEXIBLE TOOL BAR

[76] Inventor: Gary L. Kelderman, R.R. 1, Oskaloosa, Iowa 52577

[21] Appl. No.: 150,304

[22] Filed: Jan. 29, 1988

[51] Int. Cl.4 ............................................. A01B 73/00
[52] U.S. Cl. .................................. 172/413; 188/300; 172/316; 172/311; 172/776
[58] Field of Search ............... 172/315, 316, 413, 439, 172/311, 776, 456; 188/300, 312, 313

[56] References Cited

U.S. PATENT DOCUMENTS

| | | | |
|---|---|---|---|
| 3,905,425 | 9/1975 | Jackson | 188/300 |
| 4,191,280 | 3/1980 | Copperwheat | 172/439 |
| 4,484,636 | 11/1984 | Hodgson | 172/701 |
| 4,534,575 | 8/1985 | Grove | 188/300 |
| 4,561,505 | 12/1985 | Williamson | 172/311 |
| 4,607,708 | 8/1986 | Landphair | 172/311 |

OTHER PUBLICATIONS

Copy of two photographs showing Rich Henry's Version of a Planter Tool Bar.

Primary Examiner—Richard J. Johnson
Attorney, Agent, or Firm—Henderson & Sturm

[57] ABSTRACT

A flexible tool bar apparatus including a first tool bar adapted to have earth working implements attached thereto and a second tool bar also adapted to have earth working implements attached thereto. Two tool bars are pivotally attached at the inner ends thereof. A hydraulic cylinder mechanism is operatively attached at one end thereof to the first tool bar and is operatively attached at the other end thereof to the second tool bar. A fluid device is provided for selectively supplying fluid under pressure to a hydraulic cylinder mechanism for causing the hydraulic cylinder mechanism to hold the tool bar from flexing. The tool bar can flex when the fluid pressure is released.

4 Claims, 3 Drawing Sheets

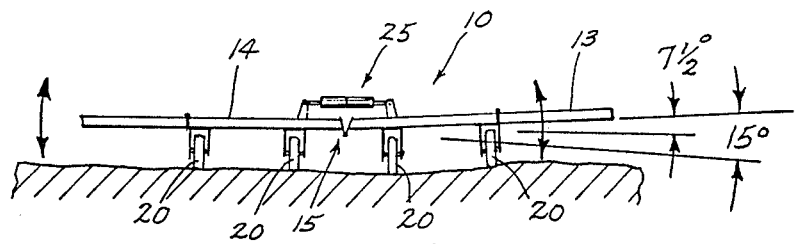
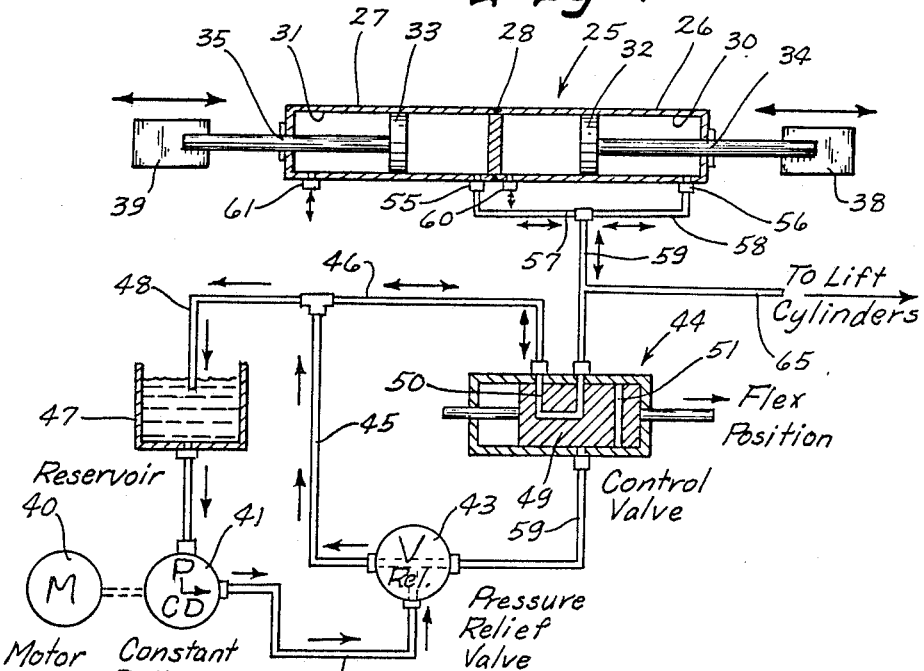
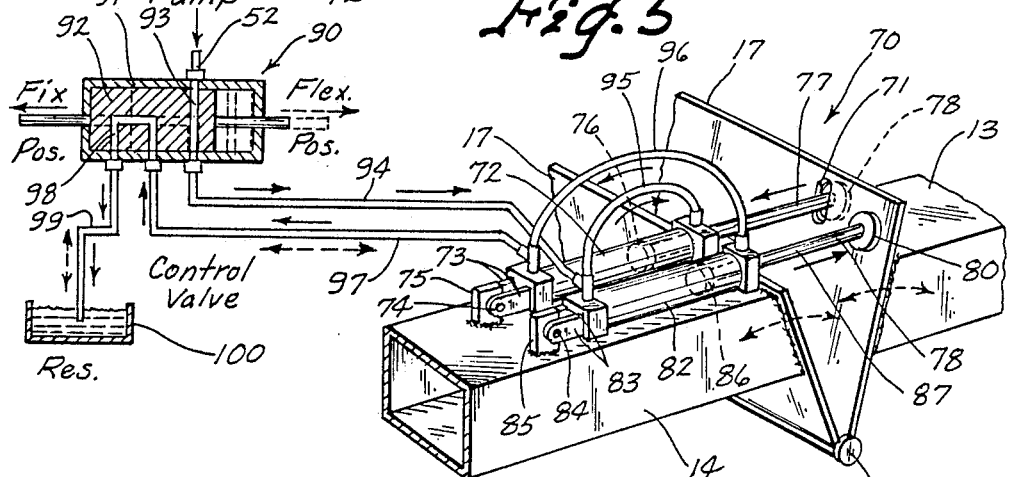

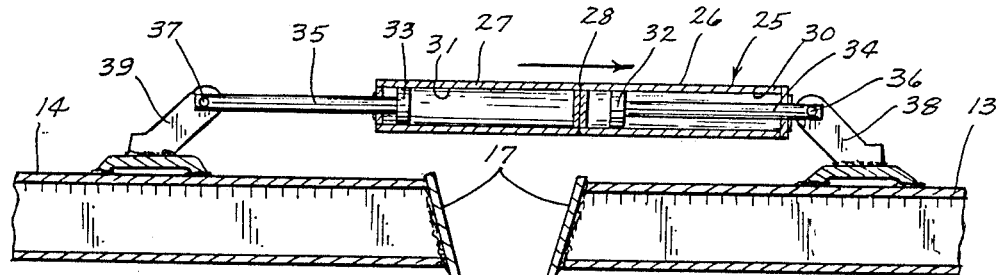
Fig. 6
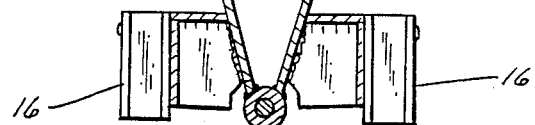
Fig. 7
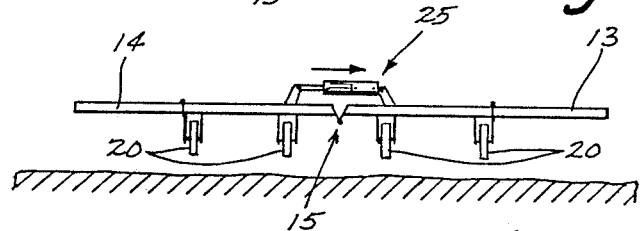
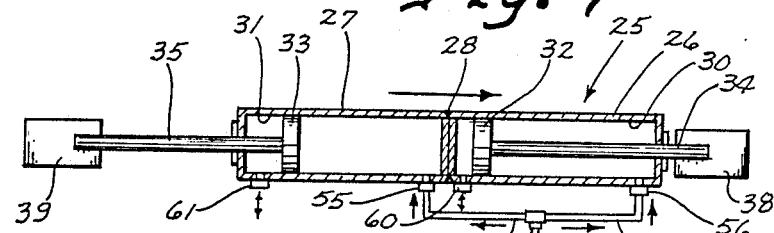
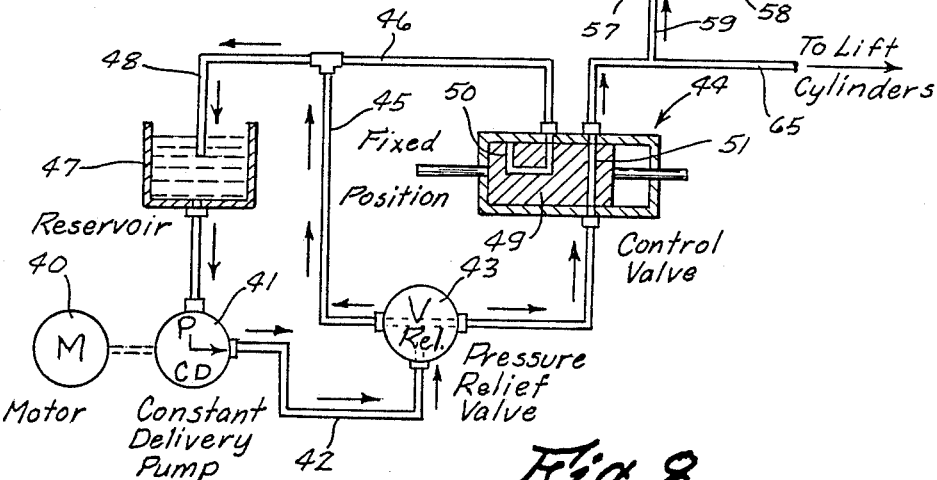
Fig. 8

HYDRAULIC LOCK FOR A FLEXIBLE TOOL BAR

TECHNICAL FIELD

The present invention relates generally to tool bars for attaching agricultural implements thereto and more particularly to a flexible tool bar having a hydraulic locking mechanism for preventing flexing of the tool bar during transport and during end of the field turnaround operations.

BACKGROUND ART

Over the years, farming efficiency has dictated that the machinery used become larger and larger. For example, tool bars that have agricultural implements attached thereto, such as planters, chisel plows, cultivators, etc. have evolved into very lengthy devices which typically fold for transport down the road and which cover many rows of crops during use. This allows the field to be worked in as few passes through the field as possible, thereby increasing efficiency of the farming operation.

These long tool bars work extremely well on level land but when the terrain becomes uneven, certain of the earth working implements will be higher from the surface of the ground than others if the tool bar itself is straight and rigid during field working operations. That is the reason that flexible tool bars have been developed. By flexing the tool bar in the middle, or at other places along the lengths if desired, the planter units or other earth working implements attached to the tool bar can be maintained approximately the same distance from the top of the ground being worked along the entire length of the tool bar. Where the land has been terraced, for example, it has been determined that a two-part tool bar pivotally attached at the center thereof works very nicely so that if the pivot is maintained at the top of the terrace by the tractor, then one side of the tool bar can hang down over one side of the terrace and the other side of the tool bar can hang down over the other side of the terrace to maintain the aforementioned approximate consistency of distance between the earth working implements attached to the tool bar and the top of the ground.

One of the problems associated with a flexible tool bar of the type mentioned above is that when it is desired to transport the implement from place to place or to merely turn around at the end of a field to make another pass through the field, the tool bar must be held straight and rigid or the ends thereof will hang down and contact the ground in an undesirable fashion. Furthermore, the flexing will cause bouncing and instability in a transport situation.

Because of the need to hold the tool bar rigid during transport and turn around situations, one manufacturer has utilized a rigid turn buckle arrangement which mechanically can be engaged or disengaged and manually adjusted as to length to hold the tool bar from flexing when flexing is not desired. A major problem with such arrangement is that it is quite time consuming and inefficient at a time when economics demand that farming be efficient.

DISCLOSURE OF THE INVENTION

The present invention relates generally to a flexible tool bar apparatus including the first tool bar adapted to have earth working implements attached thereto and a second tool bar also adapted to have earth working implements attached thereto. Two tool bars are pivotally attached at the inner ends thereof. A hydraulic cylinder mechanism is pivotally attached at one end thereof to the first tool bar and is pivotally attached at the other end thereof to the second tool bar. A fluid device is provided for selectively supplying fluid under pressure to the hydraulic cylinder mechanism for causing the hydraulic cylinder mechanism to hold the tool bar from flexing. A fluid device is also provided for allowing a piston mechanism within a cylindrical bore of the hydraulic mechanism to freely move when the hydraulic fluid supplying device is disconnected from the hydraulic cylinder mechanism whereby the first and second tool bars can freely pivot with respect to each other.

An object of the present invention is to provide a hydraulic lock for pivoting tool bars.

Another object of the present invention is to provide a lock for pivoting tool bars which can be quickly and easily engaged to hold the tool bar from flexing as is necessary during transport and turn around situations while at the same time permitting the operator to quickly and easily disengage the hydraulic cylinder mechanism to allow the piston therein to freely move and thereby allowing the first and second tool bars to freely pivot with respect to each other.

A further object of the present invention is to provide a lock for a flexing tool bar which can be operated quickly and easily by hydraulic mechanisms.

Other objects, advantages, and novel features of the present invention will become apparent from the following detailed of the invention when considered in conjunction with the accompanying drawings.

BRIEF DESCRIPTION OF THE DRAWINGS

FIG. 4 is a rear view of the apparatus as shown in FIG. 1 and showing how the first and second tool bars can pivot with respect to each other as they travel over irregular ground;

FIG. 5 is a schematic view of the hydraulic operating circuit for the hydraulic lock of the present invention shown in a position to permit floating or pivoting of the first and second tool bars with respect to each other as shown in FIGS. 3 and 4;

FIG. 6 is a view like FIG. 3 but showing the hydraulic lock in operation, preventing the first and second tool bars from pivoting with respect to each other and maintaining them in alignment;

FIG. 7 is a view like FIG. 4 but showing the tool bars locked in alignment with respect to each other;

FIG. 8 is a schematic view of the hydraulic circuit of the present invention showing how the lock is utilized to hold it in the locked position as shown in FIGS. 6 and 7; and FIG. 9 shows a perspective of an alternate embodiment and a schematic view of a control system therefor.

BEST MODES FOR CARRYING OUT THE INVENTION

Figure 1:
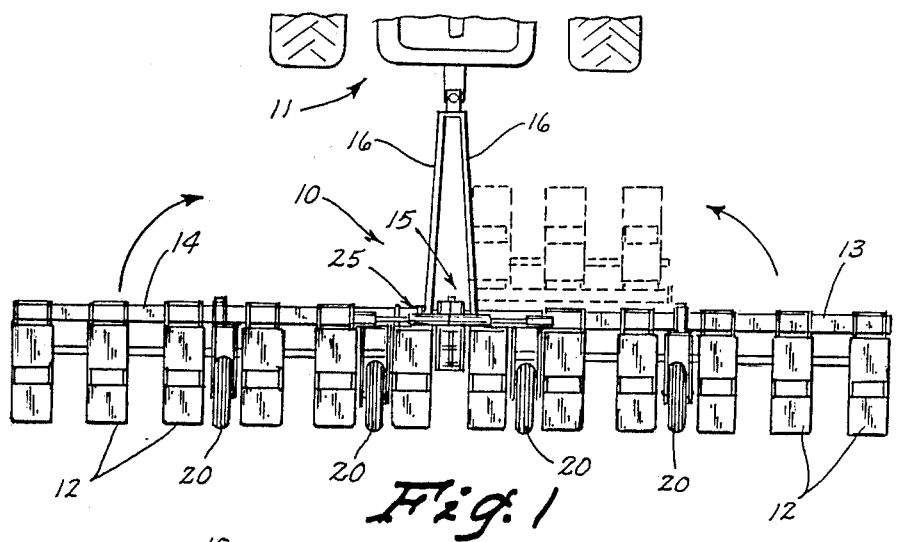
FIG. 1 is a top plan view of a flexing tool bar, constructed in accordance with the present invention and showing how the ends wings thereof can be folded therein as shown in dashed lines.
Figure 3:
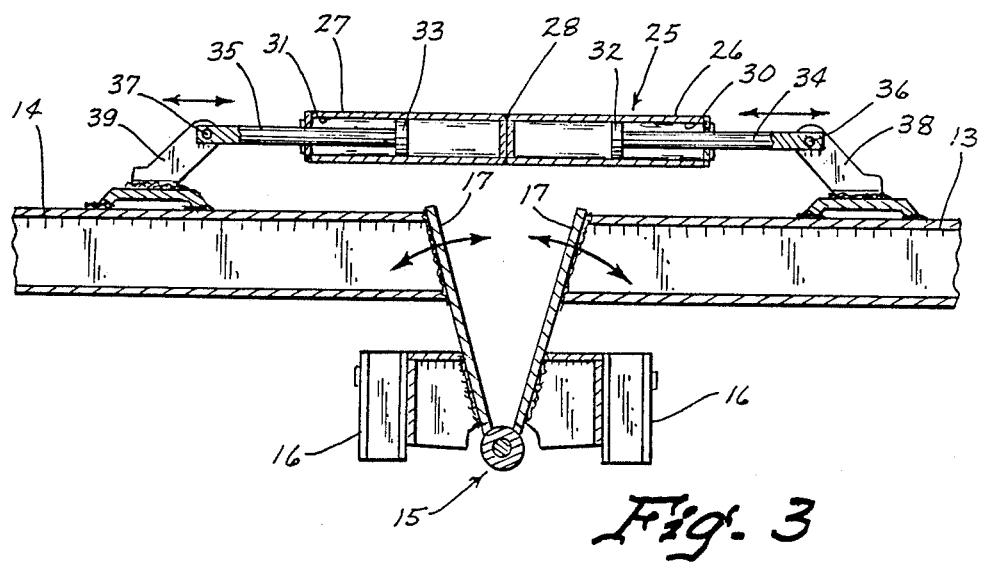
FIG. 3 is an enlarged partial cross sectional view taken along line 3—3 of FIG. 2 and showing the apparatus in a floating position wherein the first and second tool bars can freely pivot with respect to each other.

Referring now to the drawings wherein like reference numerals designate identical or corresponding parts throughout the several views, FIG. 1 shows a preferred embodiment of the present invention (10) being pulled by an agricultural tractor (11) and having a plurality of planter units (12) attached to a first tool bar (13) and a second tool bar (14) which are pivotally attached in the center thereof by a pivoting hinge (15) as is shown in FIG. 3. A pivoting tongue (16) is also utilized and has been utilized in the prior art as well.

The pivoting hinge (15) includes a pair of plates (17) which limit the amount of inward pivoting of the first and second tool bars (13 and 14) respectively.

Figure 2:
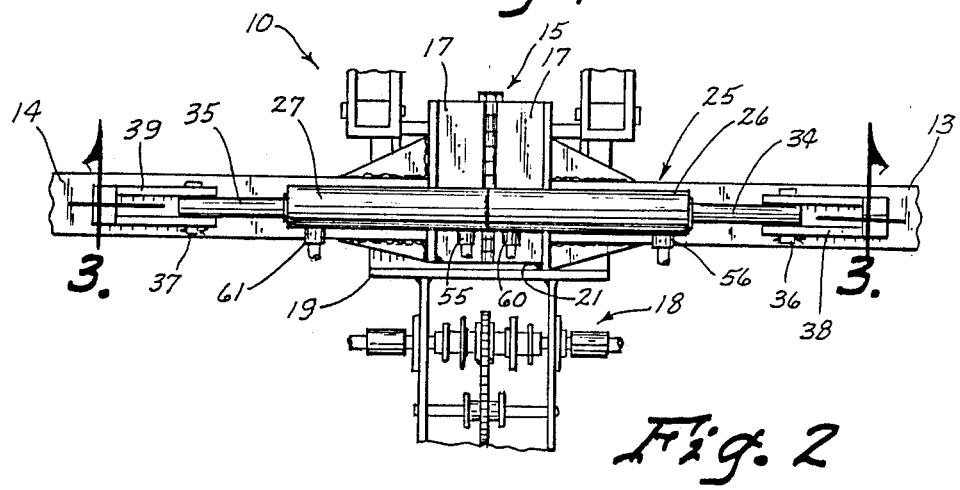
FIG. 2 is an enlarged elevational view like FIG. 1 but showing the preferred embodiment closer up and in more detail.

Referring to FIG. 2, it is noted that a driving mechanism (18) is welded to a plate (19) and this driving mechanism (18) is for turning and operating all of the planter units (12) shown attached to the tool bars (13 and 14). Lift wheels (20) have hydraulic cylinders (not shown) attached to the tool bar for selectively lifting the tool bars (13 and 14) up or down from a transport to a working position, and they can also serve as gauge wheels if desired for certain agricultural implements. These transport lift wheels (20) can be conventional lift wheel structures.

Referring again to FIG. 2, it is noted that the plate (19) is welded at the point (21) to one of the plates (17), but that it is not welded at the other side to the other plate (17). This allows the first and second tool bars (13 and 14) to freely flex while at the same time holding the driving mechanism (18) in the place that it needs to be.

The hydraulic cylinder locking mechanism (25) basically consists of two standard hydraulic cylinders welded together at the ends thereof. The first cylinder (26) is welded to the second cylinder (27) by weld (28). The first cylinder (26) has a cylindrical bore (30) disposed therein and the second hydraulic cylinder (27) has a bore (31) disposed therein. A first piston (32) is disposed in the bore (30) and a second piston (33) is disposed in the second bore (31). Piston rod (34) is rigidly attached to the piston (32) and is slideably received through the housing of the cylinder (26); similarly a piston rod (35) is rigidly attached to the second piston (33).

The ends of the piston rods (34 and 35) are pivotally attached by pins (36 and 37) to brackets (38 and 39) which are welded to the first and second tool bars (13 and 14) respectively.

Turning to FIG. 5, it is noted that a motor (40) is mechanically linked to turn a constant delivery pump (41) which delivers hydraulic fluid under pressure through conduit (42) into pressure relief valve (43). In those situations such as shown in FIG. 5 when the valve (44) prevents flow therethrough, pressure relief valve (43) will open at a predetermined pressure and supply hydraulic fluid through conduit (45) and into conduit (46) which leads to the valve (44) and will return any excess hydraulic fluid to the reservoir (47) through conduit (48). When the valve (44) is in the position shown in FIG. 5, the valve member (49), having a U-shaped opening (50) extending therethrough, connects the reservoir (47) with ports (55 and 56) in the hydraulic cylinders (27 and 26) through conduits (57, 58 and 59). When the valve member (49) is in the position shown in FIG. 5, the pistons (32 and 33) are free to move within their respective cylindrical bores (30 and 31) because hydraulic fluid is free to pass into or out of the right side of the pistons (32 and 33) as shown in FIG. 5, while at the same time vents (60 and 61) allow air to freely move in or out of the space on the left side of the pistons (32 and 33) as shown in FIG. 5. Consequently, the first and second tool bars (13 and 14) can freely flex as shown in FIGS. 3 and 4 when the valve member (49) of the valve (44) is in the position shown in FIG. 5.

When it is desired to lock the first and second tool bars (13 and 14) into alignment as is shown in FIGS. 6 and 7, then the valve member (49) is moved to the left as shown in FIG. 8 so that the passageway (51) is in alignment with conduit (52) and conduit (59) so that hydraulic fluid under pressure is supplied to the right side of the hydraulic pistons (32 and 33) through conduits (57 and 58). This will cause the housing of cylinders (26 and 27) to move to the right to the position shown in FIGS. 6 and 8 and to hold the first and second tool bars (13 and 14) from flexing or pivoting with respect to each other as is necessary during transport of the equipment from place to place or during turn around conditions at the end of the field just after one pass has been finished and another pass through the field is to begin.

Referring again to FIG. 8, it is noted that when the valve member (49) is in the position shown in FIG. 8, the vents (60 and 61) are present to allow the cylinder housings (26 and 27) to move in unison to the right because the air needs to escape on the left side of the pistons (32 and 33) when this occurs. Also at that time, the U-shaped passageway (50) is disconnected from the line (59), and is connected to conduit (46), although no flow occurs because the other end of the U-shaped passageway (50) is not in connection with anything.

An optional feature of the present invention will allow conduit (65) to go to the lift cylinders so that when high pressure fluid is supplied through line (52) to engage the hydraulic lock-out mechanism (25), the lift cylinders will lift the first and second tool bars (13 and 14) by moving the lift wheels (20) downwardly to the position shown in FIG. 7. Alternatively, when the valve (49) is in the position shown in FIG. 5, the supply of hydraulic fluid through the conduit (65) is low because of having gone through the pressure relief valve (43), thereby preventing the lift cylinders on the wheels (20) from lifting up the tool bars (13 and 14).

Referring now to FIG. 9, an alternate embodiment (70) is shown attached to tool bars (13) and (14). The plate on the tool bar (17) has a slot (71) disposed therethrough for reasons which will be discussed below.

A first hydraulic cylinder (72) has a clasp (73) attached to one end thereof which is pivotally attached to the tool bar (14) by a pin (74) extending through the clasp (73) and through a bracket (75-) welded to the tool bar (14). The hydraulic cylinder (72) has an internal piston (76) rigidly attached to a shaft (77) which has an enlarged head (78) on one end thereof.

A second hydraulic cylinder (82) has a clasp (83) pivotally attached to the tool bar (14) by a pin (84) extending through the clasp (83) and through a bracket (85) which is welded to the tool bar (14). A piston (86) is slidably received within the cylinder (82) and has a shaft (87) rigidly attached to the piston (86). An enlarged end (88) is welded to the extreme other end of the hydraulic cylinder (82) and directly to piston rod (87).

In operation, when it is desired to utilize the apparatus (70) to prevent the tool bars (13) and (14) from pivoting with respect to each other or flexing as it is sometimes referred to in this art, the valve (90) having a housing (91) and movable valve member (92) is utilized by moving the valve member (92) to the fixed position as shown in solid lines in FIG. 9. In this position, fluid under pressure will pass through inlet port (52), through passageway (93) in valve member (92) and through line (94). This will cause such fluid under pressure to enter the cylinder (82) on the left side of the piston (86) as shown in FIG. 9 and the conduit (95) will also permit such fluid under pressure to enter the cylinder (72) on the right side of piston (76) as shown in FIG. 9. At the same time, fluid which may be present on the right side of the piston (86) and the left side of piston (76) can pass out through conduits (96) and (97), through passageway (98) and out conduit (99) and into the reservoir (100). When the apparatus (70) shown in FIG. 9 is held in such position, it will be noted that no pivoting of the tool bars (13) and (14) can occur because the head (78) of the first cylinder (72) will be pulling on the rightmost plate (17) while at the same time, the head (80) of the second cylinder (82) will be pushing on the plate (17), thereby preventing such pivoting.

When it is desired to permit the tool bars (13) and (14) to pivot with respect to each other, then the valve member (92) is moved from the fixed position shown in solid lines in FIG. 9 to a rightmost position shown in dashed lines in FIG. 9 whereby the fluid under pressure through port (52) is shut off from the line (94) and instead the passageway (98) communicates the lines (94) and (97), which essentially permits fluid to flow back and forth on either side of the pistons (76) and (86) thereby allowing the piston rod (77) and (87) to move freely. It is noted that the piston rod (77) is substantially longer than the piston rod (87) in order to achieve the proper position of the head (78) with respect to the plate (17).

Accordingly, it will be appreciated that the preferred embodiments shown herein do indeed accomplish the aforementioned objects. Obviously many modifications and variations of the present invention are possible in light of the above teachings. For example, the present invention is fully applicable to a three point hitch-type flexible tool bar which is raised up and down by the three point hitch of the tractor (11) rather than utilizing lift wheels (20) as is shown in the preferred embodiment herein. It is therefore to be understood that, within the scope of the appended claims, the invention may be practiced otherwise than as specifically described.

I claim:

1. Flexible tool bar apparatus comprising:
   a first tool bar adapted to have earth working implements attached thereto, said first tool bar having an inner end and an outer end;
   a second tool bar adapted to have earth working implements attached thereto, said second tool bar having an inner end and an outer end;
   means for pivotally attaching the inner ends of said first and second tool bars together whereby said first and second tool bars can pivot with respect to each other;
   a housing having a first and a second cylindrical bore disposed therein, said first and second cylindrical bores being formed substantially about the same axis and having a sealed dividing wall disposed between them, said first and second cylindrical bores each having an outer end and an inner end;
   a first piston disposed in sealing and sliding contact with, the first cylindrical bore and having a first rod disposed along said axis and having one end thereof attached to said first piston, said first rod extending outwardly from said housing in sliding engagement with said housing;
   a second piston disposed in sealing and sliding contact with the second cylindrical bore and having a second rod disposed along said axis and having one end thereof attached to said second piston, said second rod extending outwardly from said housing in sliding engagement with said housing;
   means rigidly attached to said first tool bar for operatively pivotally attaching the other end of said first rod to said first tool bar;
   means rigidly attached to said second tool bar for operatively pivotally attaching the other end of said second rod to said second tool bar;
   supply means for supplying hydraulic fluid under pressure;
   fluid conduit means for selectively connecting said supply means with the outer end of said first cylindrical bore and with the inner end of the second cylindrical bores whereby when said supply means supplies fluid under pressure to the outer end of the first cylindrical bore and to the inner end of the second cylindrical bore, said housing will move toward said first tool bar and away from said second tool bar and will hold said first and second tool bars from flexing with respect to each other and when said supply means is disconnected from said first and second cylindrical bores, said first and second tool bars will be free to flex since said first and second pistons will be free to move within said first and second cylindrical bores respectively.

2. Flexible tool bar apparatus comprising:
   a first tool bar adapted to have earth working implements attached thereto, said first tool bar having an inner end and an outer end;
   a second tool bar adapted to have earth working implements attached thereto, said second tool bar having an inner end and an outer end;
   means for pivotally attaching the inner ends of said first and second tool bars together whereby said first and second tool bars can pivot with respect to each other;
   hydraulic cylinder means operatively attached at one end to said first tool bar and operatively attached at the other end thereof o said second tool bar, said hydraulic cylinder means including at least one piston slideably received inside a cylindrical bore;
   means for selectively supplying fluid under pressure to said hydraulic cylinder means for causing said hydraulic cylinder means to hold said tool bars from flexing downwardly at the outer ends thereof with respect to the inner ends thereof; and
   means for allowing said piston to freely move within said cylindrical bore when said supplying means is disconnected from said hydraulic cylinder means whereby said first and second tool bars can freely pivot with respect to each other.

3. The apparatus of claim 1 including: first hydraulically operated lift means attached to said first tool bar and having a ground engaging wheel thereon for selectively raising or lowering said first tool bar;
   second hydraulically operated lift means attached to said second tool bar and having a ground engaging wheel thereon for selectively raising or lowering said second tool bar; and means for connecting said supply means to said fluid conduit means whereby when said first and second lift means are engaged, said first and second tool bars will be prevented from flexing with respect to each other and when said lift means are disengaged, the first and second tool bars can pivot with respect to each other.

4. Flexible tool bar apparatus comprising:

a first tool bar adapted to have earth working implements attached thereto, said first tool bar having an inner end and an outer end;

a second tool bar adapted to have earth working implements attached thereto, said second tool bar having an inner end and an outer end;

means for pivotally attaching the inner ends of said first and second tool bars together whereby said first and second tool bars can pivot with respect to each other;

first hydraulic cylinder means pivotally attached at one end to said first tool bar, said first hydraulic cylinder means including a piston slideably received inside a cylindrical bore;

means for slideably attaching the other end of said first hydraulic cylinder means to said inner end of said second tool bar through a slot in said second tool bar, said other end of said hydraulic cylinder having an enlarged head thereon whereby when said first hydraulic cylinder is allowed to extend, the second tool bar can freely pivot upwardly, and when said second hydraulic cylinder is at least partially retracted, the head on the other end of the first cylinder prevents the second tool bar from pivoting downwardly with respect to the first tool bar;

second hydraulic cylinder means pivotally attached at one end thereof to said first tool bar, said second tool bar including a piston slideably received inside a cylindrical bore;

means on the other end of said second piston for abutment with said inner end of said second tool bar whereby when said second hydraulic cylinder means is extended, said second tool bar is prevented from pivoting upwardly and when said second hydraulic cylinder means is allowed to retract, said second tool bar is permitted to pivot upwardly;

means for selectively supplying fluid under pressure to one side of the piston of the first hydraulic means and to the other side of the piston of the other hydraulic cylinder means for causing said first and second hydraulic cylinder means to hold said tool bars from flexing downwardly at the outer ends thereof with respect to the inner ends thereof; and means for allowing said pistons to freely move within said cylindrical bore when said supplying means is disconnected from said hydraulic cylinder means whereby said first and second tool bars can freely pivot with respect to each other.

* * * * *